UNITED STATES PATENT OFFICE 2,597,346

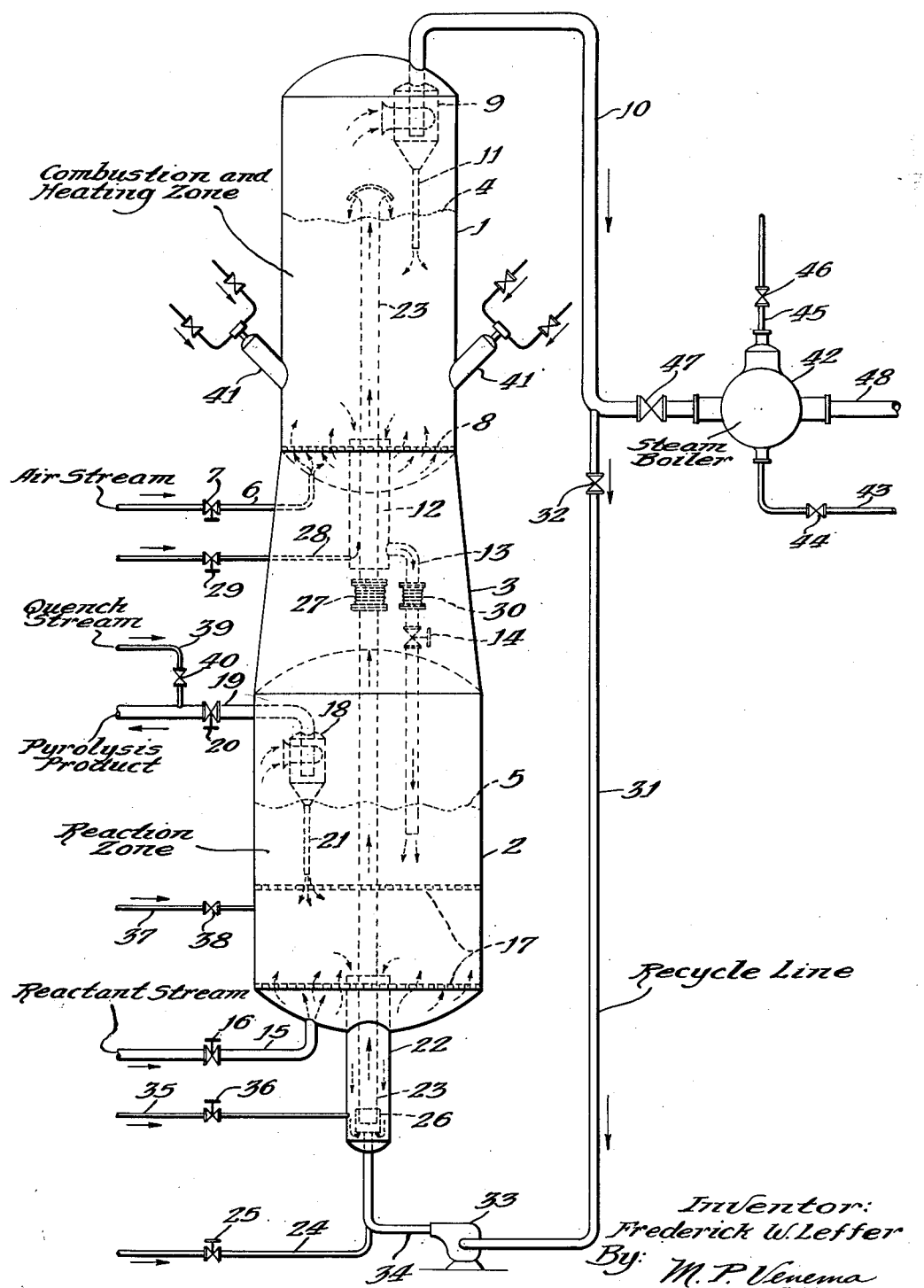

METHOD FOR EFFECTING THE CONVERSION OF ORGANIC REACTANT STREAMS

Frederick W. Leffer, Riverside, Ill., assignor to Universal Oil Products Company, Chicago, Ill., a corporation of Delaware Application October 29, 1948, Serial No. 57,373

9 Claims. (Cl. 260—683)

This application is a continuation-in-part of my co-pending applications Serial No. 706,914, filed October 31, 1946, (now Patent No. 2,459,824) and Serial No. 734,396, filed March 13, 1947, (now Patent No. 2,548,030), the latter application being a continuation-in-part of application Serial No. 607,889, filed July 30, 1945 (now Patent No. 2,422,791), which in turn was a continuation-in-part of application Serial No. 480,357, filed March 24, 1943 (now Patent No. 2,396,709).

This invention relates to a process for effecting the conversion of organic reactant streams by direct contact with heated particles of a heat retentive solid contact material. More specifically, the invention is directed to an improved method of effecting the thermal conversion of hydrocarbons in the presence of heated refractory solid particles maintained in a continuous downwardly moving bed of particles in both a reaction zone and a heating zone elevated above the reaction zone, with a continuous supply of heated particles from the heating zone to the reaction zone and a continuous return of contacted particles from the latter to the heating zone.

The process is particularly adaptable to hydrocarbon reactions of an endothermic nature, such as the reforming of low grade naphtha or gasoline stocks to provide an improved high octane product, and high temperature, short contact time thermal reactions directed to the production of olefins, dienes, acetylene or mixtures thereof from more saturated low molecular weight liquid hydrocarbons. Such reactions are advantageously conducted by passing the charge stream in direct contact with a bed of highly heated granular or spheroidal material for a required conversion period, which may be controlled by suitably quenching the gasiform reaction products to give a short reaction time and to limit secondary reactions. In a countercurrent contact of reactant with a moving bed of solid particles, such as provided by the present invention, the high temperature contact time is readily controlled and adjusted by varying the depth of the bed of solid particles, as well as by the velocity of the reactant stream passing through the bed.

It is a principal object of the present invention to provide a method for conducting the continuous conversion of an organic reactant stream by contact with a bed of heated particles of a heat retentive solid contact material which is maintained in an efficient and thermally improved cyclic flow through the reaction zone and the heating zone.

It is also an object of the invention to provide a method for effecting the continuous pyrolytic conversion of a hydrocarbon reactant stream by contact with heated subdivided solid particles in an operation wherein heated particles are supplied to the reaction zone by gravitational flow from an elevated heating zone and the contacted particles are returned in a fluidized or suspensoid stream from the reaction zone to the elevated heating zone by a gas stream comprising uncooled combustion gases generated in the latter zone.

It is a further object of the invention to provide a cyclic flow for the solid particles whereby the contacted particles are returned from the reaction zone to the elevated heating zone in a vertical confined straight line path which extends upwardly through and in indirect heat exchange relationship with a continuous bed of the solid particles descending in substantially unobstructed flow through the heating zone countercurrently to hot combustion and heating gases.

Still a further object of the invention resides in providing a cyclic flow for the solid particles whereby the contacted particles are returned to the elevated heating zone in a vertical confined straight line path which passes upwardly through the reaction zone in indirect heat exchange relationship therewith, and wherefrom only solid particles are returned to the top portion of the descending bed in the heating zone.

Other objects and advantages of the improved flow method of this invention will be pointed out in the subsequent description. The general principles of the moving bed and fluidized operations using subdivided solid contact material are now well known to the chemical and petroleum arts and need not be described in detail herein. The solid contact material in the present operation may be relatively inert or may possess some catalytic activity for promoting the desired reaction, and in any event it is a heat retentive material capable of substantially retaining its shape and size for prolonged periods of time under the severe conditions of use contemplated herein. The heat retentive material in this operation is preferably of a refractory nature capable of withstanding heating temperatures of 1500° to 3000° F. The particles may be made of refractory materials of the type of aluminum oxide, corundum, silica, silicon carbide known as Carborundum, zirconia, and composites of two or more of these materials, or of the type of high melting point metals and metal alloys, such as nickel and nickel alloys having melting points in the order of 2400°–2700° F. For substantially non-catalytic use at the higher heating temperatures within the aforesaid range, refractory particles consisting essentially of corundum, Carborundum, vitrified zirconia, or similar commercially available specially prepared ceramic materials, having a melting point substantially in excess of 3000° F., a density of the order of from about 2.32 to about 5.73 and an appreciable resistance to shattering, are preferred. The solid particles are limited to a size suitable to effect a fluidized transfer from the lower end of the reaction zone to the superimposed heating zone. Also, the particles are preferably spherical in form such that they readily flow by gravity and are not subjected to undue attrition during their cyclic movement in the processing unit.

Broadly, the present method for converting an organic reactant stream comprises maintaining a particle bed of subdivided solid heat retentive contact material in each of a confined reaction zone and a confined heating zone maintained at higher elevation than said reaction zone, passing said organic reactant stream upwardly at conversion temperature through the bed in the reaction zone, removing a stream of fluid conversion products from the upper portion of the reaction zone and continuously withdrawing contacted solid particles from the lower portion thereof and commingling them with an upwardly flowing gas stream comprising hot combustion gases obtained as hereinafter set forth, passing the resultant suspension upwardly in a confined straight line path extending through substantially the height of the bed in the heating zone and discharging the solid particles from the suspension to the top portion of the bed in the heating zone, continuously passing a free oxygen-containing gas upwardly through the bed in the heating zone and burning carbonaceous material therein, passing a stream of the resultant heated particles downwardly from the lower portion of the heating zone at a temperature above said conversion temperature to the bed in the reaction zone, discharging the hot combustion gases upwardly from the descending bed and said confined straight line path in the upper portion of the heating zone and therefrom supplying a stream of said hot combustion gases to said withdrawn contacted particles entering the confined straight line path.

In a preferred embodiment, the invention provides for effecting the pyrolytic conversion of an organic reactant stream by a method which comprises, maintaining a downwardly moving bed of subdivided solid heat retentive particles in each of a confined reaction zone and a superimposed heating zone, said zones being in vertical alignment with one another, passing the organic reactant stream upwardly at a conversion temperature through the bed in the reaction zone, removing a stream of fluid conversion products from the upper portion of the reaction zone and continuously withdrawing contacted solid particles from the lower portion thereof and commingling them with an upwardly flowing hot gas stream comprising hot combustion gases obtained as hereinafter described, passing the resultant suspension upwardly in a confined straight line path through each of the beds in the superimposed zones and discharging the same into the upper portion of the heating zone, continuously passing a free oxygen-containing gas upwardly through the bed in the heating zone and burning carbonaceous material therein, passing a stream of the resultant heated solid particles downwardly from the lower portion of the heating zone at a temperature above said conversion temperature to the upper portion of the bed in the reaction zone at a rate sufficient to effect the pyrolytic conversion of the reactant stream, discharging hot combustion gases upwardly from the descending bed and said confined straight line path in the upper portion of the heating zone and therefrom supplying a stream of said hot combustion gases at substantially undiminished temperature to said withdrawn contacted particles entering the confined straight line path whereby said stream of hot combustion gases is used in reheating the contacted particles and transporting them to the elevated heating zone.

In converting an organic reactant stream, such as in effecting the pyrolytic conversion of a hydrocarbon reactant, there will be deposited on the heated particles a carbonaceous coating or contaminant which can be oxidized therefrom in the heating zone. In the present operation, the burning and oxidizing of this contaminating material is utilized to provide at least partially, the heating of the particles to supply the heat requirements of the conversion reaction to the reaction zone. However, in an advantageous mode of operation the present invention provides also for the introduction of auxiliary heating to the particles in the downwardly moving bed of the elevated zone, so that the heat retentive particles may be given a predetermined temperature as required by the particular pyrolytic conversion being carried out in the reaction zone, without the necessity of depositing on the solid particles in the reaction zone an amount of carbonaceous material sufficient for generating by its combustion the heat requirements of the operation. Burners, or the like, are attached to the elevated heating zone in a manner to introduce fuel, or both fuel and air from an extraneous source to the system and provide the auxiliary heat requirement by combustion of such fuel in the descending bed in the heating zone or by combustion of the added fuel in the burners and discharge of the hot combustion products therefrom directly into the bed in the heating zone.

The present invention provides a generally countercurrent contact not only in the elevated heating zone but also between the solid particles and the reactant stream in the reaction zone. Turbulence of the contact mass may vary, depending upon the quantity and the velocity of the reactant and the size and density of the solid heat carrying particles. A fluidized contact may be utilized in the contacting zones, however, the flow in the reaction zone should be such that the solid particles maintain a generally downward flow or countercurrent settling with respect to an upwardly moving vaporous reactant stream. Particles which are entrained by the reaction products disengaging from the descending relatively dense phase bed may be returned to this bed in the lower part of the reaction zone by means of suitable particle separating apparatus.

In a more specific embodiment, there is provided a continuous method for pyrolytically converting a hydrocarbon reactant stream comprising, maintaining a downwardly moving bed of finely divided solid heat retentive particles in each of a vertically disposed and confined reaction zone and in a heating zone which is disposed in vertical alignment with the reaction zone and is superimposed above the latter, passing the hydrocarbon reactant stream upwardly through the bed in the reaction zone at conversion conditions of controlled temperature and velocity, removing a stream of resulting fluid conversion products from the upper portion of the reaction zone and continuously withdrawing contacted solid particles from the lower portion thereof and commingling them with an upwardly flowing hot gaseous stream comprising controlled proportions of a free oxygen-containing gas stream and hot combustion gases obtained as hereinafter described, passing the resultant suspension upwardly in a confined straight line path vertically through the particle beds in each of the superimposed zones and subsequently discharging the same into the upper portion of the heating zone, incompletely burning carbonaceous material from the particles during their upward travel through the straight line path, passing a gas stream of substantially higher free oxygen content than that of said hot gaseous stream upwardly through the bed descending as a continuous mass in substantially unobstructed flow through the heating zone and therein burning residual carbonaceous material from the particles and heating them to a temperature above that required for the pyrolytic conversion in the reaction zone, passing a stream of the thus heated solid particles to the top portion of the bed in the reaction zone, discharging hot combustion gases upwardly from the descending bed and the confined straight line path in the upper portion of the heating zone and therefrom supplying a stream of said hot combustion gases at substantially undiminished temperature to the lower end of the confined straight line path to mix with the first-mentioned oxygen-containing gas stream and utilizing the hot gas mixture thus obtained for transporting the contacted particles to the elevated heating zone in the aforesaid manner.

A particular feature of the present invention resides in the transfer of the contacted solid particles from the reaction zone to the heating zone through the confined straight line path extending through substantially the height of the particle bed in the heating zone. This confined path, defined by a substantially straight vertical riser conduit, provides structurally a passageway adapted to reduce erosion as well as flow resistance to a minimum. In the riser conduit portion in contact with the particle bed undergoing heating in the heating zone, the ascending fluidized or suspensoid mixture of contacted solid particles and gas is brought to about the same temperature as prevails in the upper portion of the bed in the heating zone; the mixture being discharged from the riser conduit is thus precluded from having any substantial cooling effect either on the top portion of the descending bed in the heating zone, or on the hot combustion gases disengaging upwardly from this bed. The rate of gas flow through the latter bed is independent of the rate of gas flow through the riser conduit; an optimum temperature distribution for effecting the substantially complete combustion of the combustibles supplied to the descending bed is attained with a minimum of oxygen requirement and with formation of combustion gases substantially devoid of free oxygen, and a maximum heat content is imparted to both the solid particles about to be discharged from the lower portion of the heating zone and the combustion gases disengaged from the solid particles into the top portion of this zone, relative to the amount of combustibles burned; that is a result incapable of attainment in a generally concurrent flow of the solid particles and oxidizing or heating gases.

Another desirable feature of the present operation is the fact that the contacted solid particles withdrawn from the reaction zone need not undergo any heat loss during their transfer to the elevated heating zone; such heat loss is inevitable when the particles are elevated in a mechanical conveyor or the like elevating system external to the contacting zones. The heat economy of the process is necessarily the greater, the smaller the difference between the temperature at which the contacted particles are returned to the heating zone and the temperature at which the particles are charged to the reaction zone. The utilization of a stream of the hot combustion gases, preferably at substantially their temperature of discharge from the heating zone, as the transporting medium for the contacted particles provides an operation which eliminates undesirable cooling of these particles and, moreover, assists in raising their temperature during the transfer from the reaction zone to the heating zone. The return of the particles in a confined straight line path extending upwardly through the reaction zone as well as through the particle bed in the heating zone is a further advantage in that heat is retained within the unit also along the lower portion of the riser conduit. Further, in the aforementioned alternative embodiment wherein a free oxygen-containing gas stream, preferably air, is mixed in regulated proportions with a stream of the hot combustion gases to form a preheated gas stream of controlled oxygen content, generally substantially lower than that of air, a transporting medium is obtained which by its initial burning action on carbonaceous deposits on the contacted solid particles causes generation of heat in the suspension ascending in the confined straight line path; heat thus generated materially contributes to the temperature equalization between the top portions of the confined straight line path and the particle bed in the heating zone and, moreover, is in part available for indirect heat transfer through the lower portion of the riser conduit to the particle bed in the reaction zone, thereby permitting a somewhat lower temperature level in the heating zone.

In a further desirable embodiment of the present invention, the hot combustion gases being discharged from the heating zone, in addition to supplying a gas stream for transporting the contacted particles to that zone, are utilized to produce highly heated steam or other hot gaseous medium which may be used advantageously in the process. Steam may be used as a diluent stream in the reaction zone, being charged thereto either separately or in admixture with the hydrocarbon stream as it enters the reaction zone. A hot diluent stream, such as superheated steam, is particularly beneficial in certain of the hydrocarbon cracking operations carried out at high temperatures, particularly those for the production of gaseous olefins, dienes or acetylene. A preferred embodiment of a unit suitable to effect the improved pyrolytic conversion process of this invention, provides means for introducing the hydrocarbon stream to the reaction zone either at the lower end of the contacting bed or at an intermediate point of elevation of this bed. Similarly, provision may be made for permitting a diluent stream to be introduced at the lower end of the bed in the reaction zone, or alternately at an intermediate point thereof. In the production of gaseous olefins, dienes, acetylene, or the like, the gasiform product stream is normally passed directly to a quenching zone; however, provision is also made to introduce a quench stream to the product stream immediately as it leaves the reaction zone, whereby undesired after reactions may be precluded. Quenching may, of course, be omitted or applied to only a limited extent whenever it is desired to pass the fluid product stream from the reaction zone of the herein described system to another separate reaction zone for use as reactant at an elevated temperature in the latter zone.

In the present embodiment, steam or other diluent material may be heated by indirect heat exchange with the flue gas stream, as well as by direct contact with the particles in the lower portion of the reaction zone. In a mode of operation contemplated within the broader aspects of the invention, but not exactly equivalent to the foregoing diluent heating methods, a portion of the hot subdivided solid material may be withdrawn from the heating zone and passed to a separate contacting zone for heating the diluent, preferably by upward flow countercurrently to a descending bed of the hot solid particles, to a high temperature prior to its introduction to the reaction zone, the stream of hot solid particles so used being subsequently commingled with the stream of contacted particles discharged from the reaction zone and the commingled streams being then passed upwardly through the confined straight line path to the heating zone for reheating. For example, in the conversion of low molecular weight paraffinic and/or olefinic hydrocarbons (excepting methane) into acetylene, the processing may be carried out at temperatures in the range of from about 1900° with contact times of 0.1–0.003 second to 2800° F. with contact times of 0.0035–0.0004 second, at a total pressure of practically atmospheric, and in such operation the partial pressure of the reactant stream is advantageously reduced to about 0.5 atmosphere absolute or less and preferably to about 0.25–0.15 atmosphere absolute by commingling the reactant in close proximity of its admission to the particle bed of the reaction zone with an appropriate amount of steam separately heated in the aforesaid manner to about the desired conversion temperature.

The desired reaction temperature, of course, will vary in accordance with the particular conversion process being carried out, as well as with the nature of the reactant and the contact time. This applies not only to the conversion conditions indicated above for acetylene production, but also to the processing having different products in view. Thus, normally gaseous olefins may be produced by pyrolytic cracking of a hydrocarbon reactant of the group consisting of the normally gaseous hydrocarbons of higher molecular weight, normally liquid hydrocarbons and hydrocarbon oils, at temperatures of from about 1350° F. with contact times of 0.8–10.0 seconds to about 1900° F. with contact times of 0.0035–0.05 second. At these conditions, ethylene is obtainable in substantial yields together with other unsaturated hydrocarbons, and overcracking and undue carbon deposition on the contact particles may be substantially suppressed by lowering the partial pressure of the hydrocarbon charge to 0.5–0.8 atmosphere absolute. By recirculation of the products heavier than ethylene, maximum yields of ethylene may be obtained at these conditions. However, for optimum yields of ethylene as the principally desired product in a single pass treatment it is preferable, particularly when converting normally gaseous hydrocarbon reactants, to operate at temperatures upwardly from those last mentioned above and shorter contact times, up to about 2600° F. with contact times of 0.002–0.003 second, and with a partial pressure of the reactant of about 0.35–0.2 atmosphere absolute. Butadiene may be produced along with ethylene as principal reaction products from butanes and butenes at temperatures of from about 2000° F. with contact times of 0.007–0.016 to about 2100° F. with contact times of 0.0013–0.0026, and preferably at partial pressures of the reactant in the order of 0.4–0.2 atmosphere absolute. Predominantly aliphatic charging stocks boiling in the gasoline range, and particularly olefinic gasoline fractions rich in pentenes, as well as the pentenes themselves yield butadiene and other dienes, for example isoprene in the case of trimethylethylene as reactant, in substantial amounts at conversion temperatures of from about 1250° F. with contact times of 0.2–1.2 seconds to about 1600° F. with contact times of 0.025–0.1 second, particularly when charging the hydrocarbon reactant at a partial pressure of about 0.5–0.15 atmosphere absolute. Reforming for improvement of the motor fuel characteristics, particularly octane number, of naphthas may be effected by converting the naphtha charge at reaction temperatures of from about 1050° F. with contact times of 7–10 seconds to about 1160° F. with contact times of 0.8–2.3 seconds, at pressures from atmospheric to 250 pounds per square inch, or more, high pressures being preferred when it is desired to reduce the by-product formation of normally gaseous hydrocarbons to a minimum.

In the present conversion operation it is desirable to strip the particle streams of the solid contact material at their withdrawal from the contacting zone with an inert medium in order to remove occluded and adsorbed vaporous or gaseous components. It is an advantage of the present operation to withdraw the refractory particles from each of the contacting zones in an elongated annular column, formed around the riser conduit which is utilized to transfer the particles from the reaction zone to the elevated heating zone. Thus, the annular column arrangement provides an elongated stripping zone suitable for flowing an inert hot stripping medium countercurrently through the particles and to remove the undesired occluded materials. The stripping medium may be high temperature steam produced in accordance with a preferred mode of operation of the present process, a portion of the flue gases, or a hot inert medium supplied from an external source.

The accompanying drawing illustrates diagrammatically an elevational view of a pyrolytic contacting unit suitable for carrying out the improved high temperature conversion of organic reactant streams in accordance with this invention and the following description thereof will serve to more clearly show the flow arrangement and its operation, as well as point out additional advantageous features of the invention.

Referring now to the drawing, there is shown an upper contacting chamber 1, a lower contacting chamber 2 and a skirt or connecting section 3 which serves to support the upper chamber above the lower. Each of the contacting chambers is adapted to maintain a downwardly moving or fluidized bed of subdivided solid, refractory heat retentive contact material, which as hereinbefore noted, may be of a ceramic or metallic nature suitable to withstand high temperatures and which should have as high as possible a specific heat. The top of the bed in the upper chamber is indicated by the broken line 4 while the top of the contact bed in chamber 2 is indicated by the broken line 5. The refractory particles are preferably provided in a spherical form such that they will flow easily by gravity, and in a manner resembling the flow of a liquid, from the lower end of the upper contacting zone to the lower contacting zone. The particles in the preferred operation should generally have diameters of less than 3 mm., and in the case of contact materials having a density greater than about 6, their maximum size should be limited to about 1 mm. The best average size for particles of contact materials of the oxide and carbide type is 75–200 microns, while that for particles of the metallic contact materials is about 60–80 microns.

In the arrangement as illustrated and now to be described, the upper contacting chamber 1 is utilized as a combustion and particle heating zone, while the lower chamber 2 is utilized as the conversion zone. In operations at relatively moderate temperatures and long contact times, the reactant stream to be converted is normally supplied to the reaction chamber 2 by way of line 15 having control valve 16. One or more distributing grids 17 may be provided across the reaction chamber 2 such that improved distribution between the upwardly flowing reactant stream and the downwardly flowing heated particles may be effected. For certain high temperature pyrolytic cracking operations it may be desirable, as hereinbefore indicated, to charge a gaseous diluent with the reactant stream in order to decrease the partial pressure of the hydrocarbon, and in such case the diluent may be mixed with the hydrocarbon stream and passed through line 15 to the reaction chamber, or alternately, a diluent may be subsequently introduced through line 37 having control valve 38, whereby it enters the upper portion of the contact bed. In still other operations, more particularly those carried out at the higher temperatures and shorter contact times described above, it may be desirable to charge the hydrocarbon stream through the upper inlet line 37 and a diluent stream alone through the lower line 15, in order to provide a relatively short contact time between the reactant stream and the hot particles, and in such mode of operation additional heated diluent may also be supplied with the reactant through line 37. The depth of the contact bed in the reaction zone is variable; therefore the use of two or more inlet lines to the reaction zone, provides in combination with a varying depth bed, an operation which is flexible and may be easily controlled to carry out varying conversion operations. When using a shallow depth of the particle bed it is desirable that the reactant be supplied through line 37 slightly below a distribution grid, and rapid and uniform distribution of the reactant throughout the horizontal area of the bed may be aided by a distributing header connected to line 37, such as a header ring which is disposed immediately below the upper grid 17 shown in the drawing and which ring is provided with fine openings on its downwardly facing side for the discharge of the reactant into the bed.

The product stream resulting from the contact with the high temperature solid particles, passes from the upper portion of the reaction zone 2 through a particle separator 18 and is discharged by way of line 19 and control valve 20 to suitable quenching and recovery zones, not shown, or to a separate reaction zone (likewise not shown) for further conversion therein. Recovered heat retentive particles are passed from the lower end of the separator 18 through dip leg 21 to the contact bed within the chamber 2. In certain operations it may be desirable to provide a quenching of the reaction products very shortly after the conversion in order to prevent further cracking or polymerization reactions, in which case, a quench stream of water, steam, hydrocarbon oil, or of other cooling medium, may be introduced to the product line 19 by way of line 39, having valve 40.

The transfer of the contacted particles is effected by means of a discharge well 22 connecting with the lower end of the reaction chamber 2. The contacted particles flow downwardly in an annular column between a central riser conduit 23 and the inner wall of the well 22. At the lower end of the latter, the particles reverse their direction of flow and are passed upwardly through the riser conduit 23 to the upper portion of the upper contacting chamber 1 wherein the particles are subjected to oxidation and removal of contaminating material and are reheated for return to the lower reaction zone. The fluidizing medium utilized for transporting the contacted particles from the lower end of the withdrawal well to the upper zone, consists of or contains hot combustion and flue gases recycled from the upper chamber and introduced into the lower end of conduit 23 by way of line 34.

In the upper heating chamber 1, the particles descend countercurrently to an air or other free oxygen-containing gas stream introduced to the lower end of that zone by way of line 6 and control valve 7. This oxidizing gas passes upwardly through the distribution grid 8 and thus in a countercurrent flow effects the burning and removal of remaining carbonaceous materials on the particles. The present operation also provides that a free oxygen-containing gas stream may be mixed with the hot combustion gases in line 34 to provide a hot mixed stream of controlled free oxygen content, generally of lower free oxygen content than air, and this mixed stream is in such case utilized to transport the particles to the upper heating chamber while simultaneously effecting a partial combustion and removal of carbonaceous deposits on the heat carrying particles. There is also provided within the lower portion of withdrawal well 22, an adjustable sleeve 26 or other suitable valve, which provides means for controlling the quantity of particles passing into the lower end of the conduit 23. Further provision may be made at the lower end of the withdrawal well 22 to introduce a stripping stream, by way of line 35 having control valve 36 so that entrained and occluded gaseous or vaporous reaction products or reactants may be removed from the particles prior to their being transferred to the heating zone.

In an operation utilizing a controlled oxygen-containing stream to pass the particles upwardly through the riser conduit 23, there is effected a certain amount of burning and oxidation of the carbonaceous deposit on the particles and a partial reheating of them as they are carried upwardly to the top zone in chamber 1. Such heat may be advantageously used in the reaction zone, and the arrangement of the present invention is one which sufficiently permits the transfer of heat to the contact bed surrounding the riser conduit 23 through the wall of this conduit.

Heat transfer from the conduit 23 to the bed in the reaction chamber 2 may be aided by providing metallic fins generally longitudinally along the outside of that portion of conduit 23 which comes into contact with the particle bed in the chamber 2. In a preferable arrangement, the conduit 23 is a straight conduit passing vertically through the entire length of the lower contacting chamber and through substantially the entire height of the bed within the upper heating chamber along the central vertical axis of the superimposed chambers 1 and 2. A straight vertical conduit free from bends and internal obstructions assures an easier and more efficient fluidized transfer of the particles from the lower contacting chamber to the upper, with a minimum amount of erosion being effected in the conduit and a minimum of attrition between the refractory particles. A suitable expansion joint 27 is placed in the conduit 23 between the upper contacting chamber 1 and the lower chamber 2 such that differential expansions, due to temperature, may be accommodated between the independently supported chambers and the connecting conduit 23. It may be further noted, in the operation utilizing a fluidizing and transporting stream containing some oxygen therewith, that the oxygen content can be controlled such that the mixture of particles and resulting combustion gases at the top of the chamber 1 will be substantially devoid of oxygen and such that the particles are not entirely freed of the carbonaceous matter which may be deposited thereon during their passage through the reaction zone.

Complete oxidation and removal of contaminating matter on the particles is effected in the downwardly moving bed maintained in the upper chamber 1. Where burning and removal of the carbonaceous deposit does not increase the heat of the refractory particles to the temperature desired and necessary in the lower conversion zone, auxiliary heating may be introduced into the descending bed of particles in the upper heating chamber 1. In the present unit, suitable burners 41 are indicated connecting with the side of chamber 1 whereby fuel and air may be burned therein and hot combustion gases supplied to the downwardly moving bed of particles in order to bring the temperature of the latter up to that required in the operation. In some cases, it may be preferable to merely introduce fuel through the burner or burners 41 at the lower periphery of the vertical wall of chamber 1, and to burn this fuel in the particle bed with air supplied through line 6. In the upper portion of the chamber 1 a particle separator 9 is utilized to receive the resulting hot combustion and flue gases and entrained particles, whereby to discharge the combustion gases substantially free of solid particles through outlet line 10 and return recovered solid particles to the contact bed in chamber 1, by way of dipleg 11.

The resulting heated particles, at a temperature somewhat above that required in the reaction zone of chamber 2, are continuously withdrawn from the lower portion of the upper bed of particles and passed downwardly through a withdrawal well 12 which in turn feeds the particles into a transfer conduit 13, having a control valve 14, such that the particles may be discharged to the top of the bed in the lower chamber 2. As at the lower end of the reaction chamber, the particles are withdrawn from chamber 2 in an elongated annular column and if desired a stripping medium may be charged to the lower end of the annular column of particles by way of line 28 having a control valve 29, the stripping medium being high temperature steam, nitrogen, hot combustion gases from line 34, or other inert gaseous medium. Although not indicated in the drawing, the withdrawal well 12 and/or the lower well 22 may be provided with suitable distributing grids or plates, placed across the well at suitable vertically spaced distances to insure a uniform contact between the descending particles and the countercurrently flowing stripping medium. Also, as in the conduit 23, an expansion joint 30 may be placed in the transfer line 13 in order to accommodate linear expansion in that line due to differential temperatures in the line and the chambers to which it connects.

The hot combustion and flue gases being discharged from the upper end of the heating chamber 1, and passing through line 10, may be subsequently introduced to a heat exchanger, steam generator or steam superheater 42. Water or low temperature steam may be supplied to the steam generator 42 by way of line 43 and valve 44, while high temperature steam is recovered from the upper portion of the steam boiler by way of line 45 having control valve 46. The quantity of flue gas passing to the steam boiler 42 may be controlled by the valve 47 in line 10, and the used low temperature flue gases may be discharged from the generator by way of line 48, and may thereafter be used for preheating the air to be supplied to line 6 or to both this line and line 24.

In accordance with the preferred operation of the present invention, a portion of the hot combustion gases is recycled from line 10 to the lower end of the unit to provide a hot transfer medium for the contacted refractory particles. The recycle of the hot combustion gases is made by way of line 31, control valve 32, the blower 33, and line 34, which in turn connects with the lower end of the well 22 and introduces the hot gaseous stream into the lower end of the transfer conduit 23.

The recycle feature provides an operation which is particularly advantageous in saving heat within the conversion unit. The hot combustion gases without cooling are utilized at a high temperature to effect the transfer of the contacted particles and to permit their being carried to the heating chamber 1 without cooling, such as would normally be encountered if their transfer were made by a mechanical conveyor. It is also within the scope of the present invention to utilize the excess flue gases as a means for heating a diluent stream other than steam and to use such a diluent with the reactant stream in carrying out various high temperature short contact time pyrolytic conversions.

When applying the present process to the thermal reforming of low grade naphthas or gasolines, the reforming charge stock may be charged to the unit by way of line 15 and passed countercurrently upwardly through the heated refractory particles of the downwardly moving bed maintained in the reaction chamber 2, the resulting reformed stream passing through the separator 18 and from the chamber by way of line 19 to suitable fractionating units not shown here. In order to reduce the temperature of the effluent stream and in order to minimize coking, a quench stream from the fractionator, such as a cracked naphtha sidecut, may be introduced by way of line 39 and control valve 40 into the product stream passing through line 19. The contacted refractory particles are continuously withdrawn from the lower end of the reaction chamber and passed upwardly through the riser conduit 23 to the heating chamber 1, and as hereinbefore described, the particles are reheated in the upper zone by burning and oxidizing material from the particles; hot combustion gases are recycled at substantially undiminished temperature through lines 10, 31 and 34 in a sufficient amount to carry the solid particles from the lower end of the well 22 through the riser conduit 23 into the upper portion of the heating chamber 1, while a corresponding quantity of heated solid particles is permitted to flow by gravity through line 13 and control valve 14 to the top portion of the bed in the reaction chamber 2. In a reforming operation of this type, the particles are introduced into the lower chamber at a temperature of the order of from about 1075° F. to about 1200° F., and at a rate sufficient to accomplish the required heating for the conversion, while the contact bed in the lower chamber 2 is maintained at a suitable depth to provide the desired contact time between the reactant stream and the particles prior to the discharge and quenching of the reformed product in the outlet line 19.

The utility of the present process may be further illustrated by reference to the treatment of a hydrocarbon stream comprising a normally gaseous material such as propane or butane for the production of ethylene therefrom. This reactant stream may be charged to the lower reaction zone 2 by way of line 15 together with high temperature steam. Alternatively, when a relatively deep bed of contact material is employed and rather short contact times of the order of a fraction of a second are required, the hydrocarbon stream may be introduced through the inlet line 37 and steam through the line 15, whereby the latter is substantially superheated prior to mixing with the hydrocarbon stream in the upper part of the hot contact bed. In order to produce a high yield of ethylene, the mixed reactant stream is contacted with the solid heat retentive contact material for a short period of a few seconds or a fraction of a second, as hereinbefore indicated, while the particles are maintained in the upper part of the bed in chamber 2 at a temperature of the order of 1350° F. to 1900° F. and under a total pressure that is substantially atmospheric or only sufficiently superatmospheric to readily control the flow through the system without the use of vacuum pumps on the product discharge side thereof. The resulting product stream, rich in ethylene, is discharged from the reaction chamber 2 by way of line 19 and may be quenched with a suitable cooling stream prior to recovery in a suitable fractionating and recovery unit, not shown.

In an ethylene production operation, it may be found desirable to withdraw the used particles from the lower end of the reaction zone and pass them upwardly through the conduit 23 with the aid of a mixture of recycled hot combustion gas and preheated air whereby some burning of the carbonaceous deposit on the particles may be obtained as they pass upwardly in the riser conduit. In order words, where it is desirable to have heat flow from the riser conduit to the contact bed 5 within the reaction chamber, rather than have heat adsorbed from the contact bed 5 by the suspension within the riser conduit, the recycle stream of hot combustion gases may be mixed in controlled proportions with air or another free oxygen-containing gas stream which is introduced into the riser line by way of the line 24, connecting with the recycle line 54.

Regardless whether partial combustion is or is not effected within the riser conduit, the suspension ascending in the riser conduit 23 of the preferred apparatus arrangement is almost completely enveloped by contacting and stripping zones so that practically no loss of heat from the suspension to the atmosphere can occur. In the upper portion of the riser conduit 23, namely the portion extending through the particle bed in the heating chamber 1, the ascending suspension is enabled to absorb heat from the surrounding descending bed, and this flow of heat is the greater, the greater the amount of heat absorbed from the solid particles during their travel through the reaction zone. Temperature equalization between the upper portions of the suspension in the riser conduit and the particle bed surrounding it is advantageously fostered by generally longitudinal fins along the outside of the riser conduit portion within the chamber 1. In view of the rather high temperature levels which may be employed in the present operation for ethylene production, and also in the operations directed to the production of acetylene, butadiene or the like hydrocarbon conversion products, the preservation of heat in the riser conduit and the temperature equalization between its upper portion and the upper portion of the bed in the heating chamber 1 are important factors contributing to the unusually high heat economy attained in the present conversion method.

Particularly in the operations carried out at the higher temperatures within the ranges contemplated herein, the heat economy is enhanced further by the use of air for combustion of fuel or carbonaceous deposits, or of both these deposits and fuel from an external source, after the air has been preheated by indirect heat exchange with the partially cooled combustion gases from line 48. Particularly when using the lower portion of the particle bed in the reaction chamber 2 for the final preheating of steam or other diluent, it is advantageous to divert a stream of the hot combustion gases from line 10, at a point (not shown in the drawing) preceding the heat exchanger 42, to the air preheating system in order to bring the air immediately before its supply to chamber 1 to a temperature as close as possible to the temperature prevailing within this heating chamber. Similarly, the reactant stream before being introduced to the reaction zone may be preheated to an elevated temperature below the desired conversion temperature, and generally only up to a temperature at which the reactant begins to become reactive; this preheating may also be effected by indirect heat exchange with a stream of the hot combustion gases discharged from the heating zone. Using the heating zone as the principal source of heat for the various preheating steps as well as for the heating of the solid heat retentive contact material permits to obtain a far greater efficiency in fuel utilization than is attainable by the use of one or more separate tubular furnaces for the various preheating steps.

The present process is not limited to such low velocities of the reactant stream as would be required during its passage through the contact bed to avoid turbulence in the latter, and relatively high vapor velocities maintaining the contact material in the bed in chamber 2 in a fluidized state or in the state of hindered settling may be employed without any difficulty or disadvantage. The fluidized operation normally results in the formation of a dense phase, which resembles a boiling liquid and in which the suspended solid particles are in motion, but the density of the bed is substantially greater than the density of the material disengaging from the upper surface of the bed into the upper portion of the contacting zone, the latter material being a so-called "light phase," comprising primarily gaseous or vaporous products and a minor amount of entrained solid particles. This dense phase fluidized bed operation permits the maintenance of more uniform reaction conditions throughout the bed than are possible in a compact bed moving downwardly without turbulence. Thorough mixing of the reactant and diluent, whenever such diluent is used, and a substantially uniform contact time for all portions of the reactant are secured with great certainty even in a shallow particle bed when maintaining the latter in the fluidized dense phase and at the same time employing a distributing grid 17 within a short distance above the level of introduction of the reactant to the particle bed in the reaction chamber 2. Generally, the gas space velocity (that is the volume of gasiform fluid passing through the apparent volume of solid particles in the contacting bed per hour) of the ascending gases in the particle bed of heating chamber 1 in the present conversion method is substantially lower than that of the vaporous and/or gaseous fluids ascending in the bed of chamber 2, and generally also, the density of the descending bed in chamber 1 is greater than that of the descending bed in chamber 2; these differences are usually the greater, the higher the reaction temperature and the shorter the contact time. With these contrasting flow conditions, fluidization of the descending bed in chamber 1 is not essential for intimate contact between the solid particles and ascending gases therein; turbulence which might be created by mechanical means in the bed in heating chamber 1 is undesired because of the combined adverse effect of the oxidizing atmosphere and the erosive action of the solid particles on the metallic structures of such mechanical means. Accordingly it is preferred in the present conversion method, and particularly in operations in accordance therewith at the higher temperatures within the contemplated ranges, that the particle bed in the heating zone 1 is made to descend therein as a continuous mass in a substantially unobstructed flow, that is to say, without obstructing the downward path of the particle bed by mechanical devices or structural parts materially restricting the horizontal cross-sectional area of the bed at any level between the discharge end of the vertical riser conduit 23 and the inlet end of the annular column defined by the withdrawal well 12. For this reason also, any fins used on the outside of the riser conduit portion within the chamber 1 should extend vertically along this conduit. Adequate heat exchange for all purposes described is attained in chamber 1 by maintaining the height of the descending bed therein larger than its effective diameter (that is the diameter of a circular area equivalent to the free horizontal cross-sectional area between the outside wall of the riser conduit 13 and the inside wall of chamber 1).

It should be understood that in the high temperature pyrolytic operations, such as the production of ethylene or other gaseous olefins, or alternately the production of acetylene and the like, the temperature ranges required will normally necessitate the use of a refractory lining and insulating material in each of the contacting chambers, although in the accompanying drawing, lining materials, are not indicated in the chambers; for the same reasons, the riser conduit 23 and the downflow conduit 13 should be constructed of alloys capable of withstanding the high temperatures and other conditions to which they are subjected during use. It is also understood that all process lines carrying high temperature streams external to the contact chambers, as well as these chambers should be thoroughly insulated against loss of heat to the atmosphere, in order to attain to the fullest possible extent the high heat economy and other manifold advantages accruing from the simplicity of the apparatus requirement and flow system of the present conversion method.

I claim as my invention:

1. A continuous method for converting an organic reactant stream comprising, maintaining a downwardly moving bed of heat retentive solid particles in each of a reaction zone and a superimposed heating zone, passing said organic reactant stream upwardly at conversion temperature through the bed in said reaction zone, removing a stream of fluid conversion products from the upper portion of the reaction zone and continuously withdrawing contacted solid particles from the lower portion thereof, commingling solid particles thus withdrawn with a gas stream comprising hot combustion gases obtained as hereinafter set forth, passing the resultant suspension upwardly in a confined straight line path extending through the reaction zone and the bed therein and through substantially the height of the bed in said heating zone and maintained in heat exchange with both of said beds, discharging the solid particles from said suspension onto the top portion of the bed in said heating zone, continuously passing a free oxygen-containing gas upwardly through the bed in said heating zone and burning carbonaceous material therein, passing a stream of the resultant heated solid particles downwardly from the lower portion of said heating zone at a temperature above said conversion temperature to the upper portion of the bed in said reaction zone, discharging hot combustion gases upwardly from the descending bed and said confined straight line path in the upper portion of said heating zone, and therefrom supplying a stream of said hot combustion gases at substantially their temperature of discharge from the heating zone to said withdrawn contacted particles entering said confined straight line path.

2. The method of claim 1 further characterized in that said organic reactant stream is a hydrocarbon stream and said hydrocarbon stream is pyrolytically converted in said reaction zone at controlled conditions of temperature and time in a generally countercurrent contact with said heated particles.

3. A continuous method for pyrolytically converting a hydrocarbon reactant stream which comprises, maintaining a downwardly moving bed of sub-divided solid heat retentive particles in a confined reaction zone and a confined heating zone, the latter being disposed in vertical alignment above said reaction zone, passing said hydrocarbon reactant stream upwardly at conversion temperature through the bed in said reaction zone, removing a stream of fluid conversion products from the upper portion of said reaction zone and continuously withdrawing contacted solid particles from the lower portion thereof and commingling them with a hot gaseous stream comprising a free oxygen-containing gas and hot combustion gases obtained as hereinafter set forth, passing the resultant suspension upwardly in a confined straight line path extending through and maintained in heat exchange relation with each of the downwardly moving beds in the super-imposed zones and discharging the same into the upper portion of the heating zone, effecting a partial combustion of carbonaceous deposits from said contacted particles during their passage upwardly through said straight line path, passing a gas of substantially higher free oxygen content than that of said hot gaseous stream upwardly through the bed in the heating zone and therein burning residual carbonaceous deposits from said particles, continuously passing heated solid particles at a temperature above that required for the pyrolytic conversion of said reactant stream downwardly from the lower portion of said heating zone to the top portion of the moving bed in said reaction zone, continuously discharging the hot combustion gases upwardly from the descending bed and said confined straight line path in the upper portion of said heating zone and therefrom supplying a stream of said hot combustion gases at substantially their temperature of discharge from the heating zone to said contacted particles entering said confined straight line path.

4. A continuous method for pyrolytically converting a hydrocarbon reactant stream which comprises, maintaining a downwardly moving bed of sub-divided solid heat retentive particles in a confined reaction zone and a confined heating zone, the latter being disposed in vertical alignment above said reaction zone, passing said hydrocarbon reactant stream upwardly at conversion temperature through the bed in said reaction zone, continuously removing fluid conversion products from the upper portion of said reaction zone and continuously withdrawing contacted solid particles from the lower portion thereof and commingling them with a hot gaseous stream comprising combustion gases obtained as hereinafter set forth, passing the resultant suspension upwardly in a confined straight line path extending through and maintained in heat exchange relation with each of the downwardly moving beds in the superimposed zones and discharging the same into the upper portion of the heating zone, passing a free oxygen-containing gas stream upwardly through the bed descending as a continuous mass in substantially unobstructed flow through the heating zone, burning carbonaceous contaminants from said particles within said heating zone and simultaneously introducing heat from an external source into the downwardly moving particle bed in said heating zone, continuously passing heated solid particles at a temperature above that required for the pyrolytic conversion of said reactant stream downwardly from the lower portion of said heating zone to the top portion of the moving bed in said reaction zone, continuously discharging hot combustion gases upwardly from the descending bed and said confined straight line path in the upper portion of said heating zone and therefrom supplying a stream of said hot combustion gases at substantially their temperature of discharge from the heating zone to said contacted particles entering said confined straight line path.

5. The method of claim 4 further characterized in that heat from an external source is introduced to the bed in the heating zone by burning fuel in at least one combustion zone external to and in open communication with the lower portion of the heating zone and discharging the resultant hot combustion products from said combustion zone directly into the lower portion of the bed in said heating zone.

6. The method of claim 4 further characterized in that said hydrocarbon stream comprises a low grade gasoline fraction and the latter is pyrolytically reformed as it passes upwardly through said reaction zone at controlled reforming conditions of time and temperature and an improved reformed gasoline stock is discharged from the upper portion of said reaction zone.

7. The method of claim 4 further characterized in that said hydrocarbon stream comprises a normally gaseous hydrocarbon reactant of greater molecular weight than ethylene and said stream is passed upwardly through said reaction zone at controlled conversion conditions of high temperature and short contact time and thereby a product stream high in olefins is formed.

8. A continuous method for pyrolytically converting a hydrocarbon reactant stream which comprises, maintaining a downwardly moving bed of sub-divided solid heat retentive particles in a confined reaction zone and a confined heating zone, the latter zone being disposed in vertical alignment above said reaction zone, introducing said hydrocarbon reactant stream into the bed within said reaction zone, mixing a hot substantially inert gasiform diluent stream with said hydrocarbon reactant stream in the heated particle bed within said reaction zone and continuously passing the mixture upwardly therethrough in countercurrent contact with the hot solid particles, continuously removing conversion products from the upper portion of said reaction zone and withdrawing contacted solid particles from the lower portion thereof in a downwardly moving annular column and commingling them with an upwardly flowing gaseous stream comprising hot combustion gases obtained as hereinafter set forth, passing the resultant mixture upwardly in a confined straight line path extending through the reaction zone and through substantially the height of the moving bed in said heating zone and maintained in heat exchange with both of said beds, passing a gas containing free oxygen upwardly through the bed in said heating zone, burning residual carbonaceous contaminating material from said particles within said heating zone and simultaneously introducing heat from an external source to the downwardly moving particle bed in said heating zone, continuously passing heated solid particles at a temperature above that required for the pyrolytic conversion of said reactant stream downwardly from the lower portion of said heating zone to the top portion of the moving bed maintained in said reaction zone, disengaging the hot combustion gases upwardly from the descending bed and said confined straight line path in the upper portion of said heating zone, therefrom withdrawing a stream of said hot combustion gases and commingling it at substantially its temperature of discharge from the heating zone with the contacted particles passing from said annular column into said confined straight line path.

9. The method of claim 8 further characterized in that said inert diluent stream is introduced to the reaction zone at a level below the level of introduction of the hydrocarbon reactant stream to the particle bed therein and a rate at which the vapor pressure of the hydrocarbon reactant on entering said bed is reduced to between 0.8 and 0.15 atmosphere absolute.

FREDERICK W. LEFFER.

REFERENCES CITED

The following references are of record in the file of this patent:

UNITED STATES PATENTS

| Number | Name | Date |
|---|---|---|
| 2,331,433 | Simpson et al. | Oct. 12, 1943 |
| 2,385,446 | Jewell et al. | Sept. 25, 1945 |
| 2,389,399 | Alther | Nov. 20, 1945 |
| 2,405,395 | Bahlke et al. | Aug. 6, 1946 |
| 2,412,152 | Huff | Dec. 3, 1946 |
| 2,448,922 | Simpson et al. | Sept. 7, 1948 |
| 2,466,005 | Crowley | Apr. 5, 1949 |
| 2,486,229 | Utterback | Oct. 25, 1949 |
| 2,487,961 | Angell | Nov. 15, 1949 |